Sept. 4, 1951  A. L. CHRISTENSON ET AL  2,566,314
TEMPERATURE INDICATING APPARATUS
Filed March 7, 1946
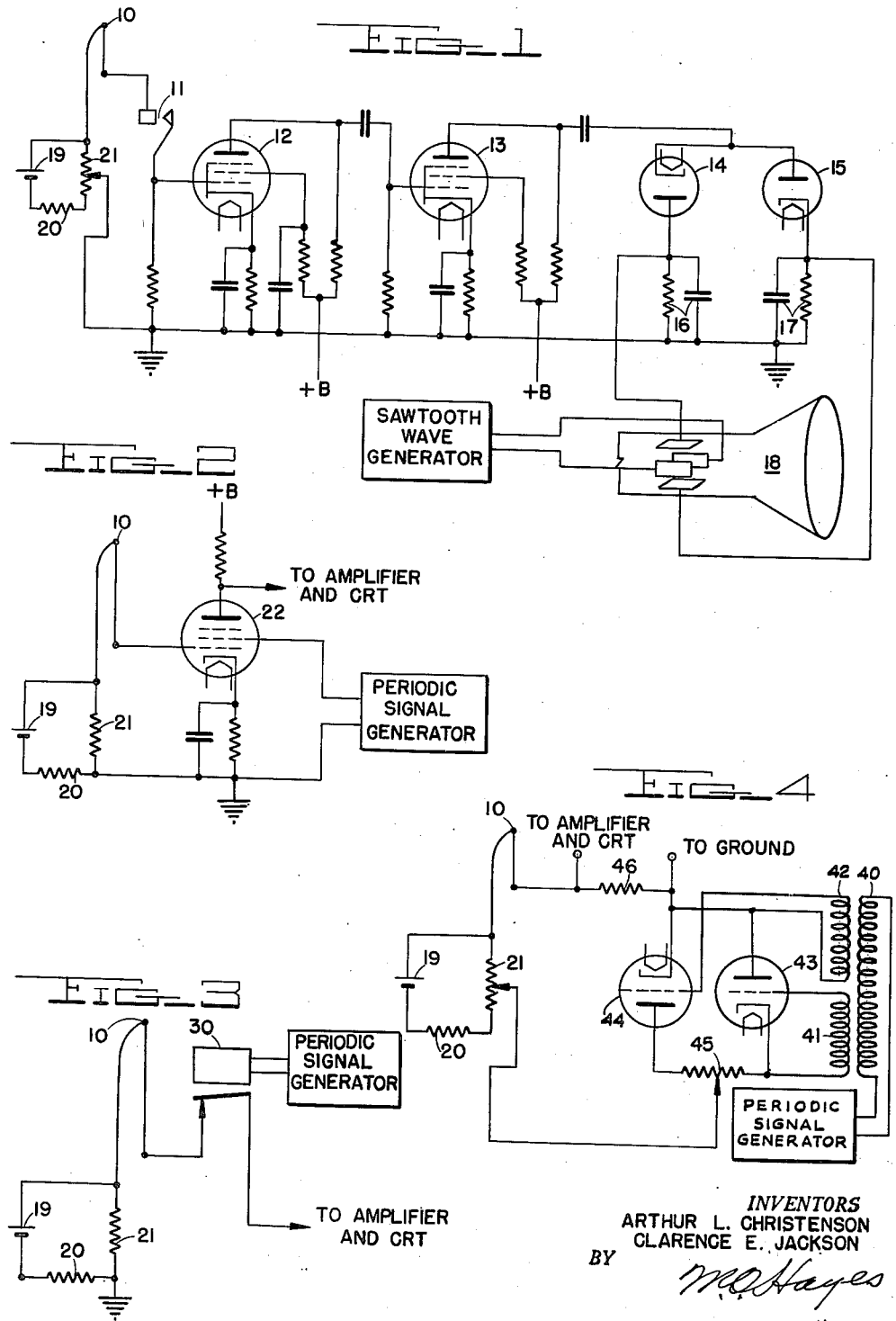
INVENTORS
ARTHUR L. CHRISTENSON
CLARENCE E. JACKSON
BY
M. O. Hayes
attorney Patented Sept. 4, 1951

2,566,314

UNITED STATES PATENT OFFICE 2,566,314

TEMPERATURE INDICATING APPARATUS

Arthur L. Christenson, Alexandria, Va., and Clarence E. Jackson, Niagara Falls, N. Y.

Original application October 11, 1944, Serial No. 558,234. Divided and this application March 7, 1946, Serial No. 652,745

3 Claims. (Cl. 73—359)

(Granted under the act of March 3, 1883, as amended April 30, 1928; 370 O. G. 757)

Our invention relates to electrical temperature indicating apparatus and more specifically to a direct reading electronic apparatus wherein thermal lag produced by inertia of moving parts of instruments has been substantially eliminated.

This application is a division of our copending application Serial Number 558,234 filed October 11, 1944, now Patent No. 2,478,895 and insofar as it contains new matter it may be considered a continuation-in-part thereof.

It is acknowledged generally in the art of pyrometry that even moderately precise measurement of extremely rapid changes in temperature is extremely difficult to perform in the study of transformations in metals, for example, and other materials which are exposed to sudden temperature variations.

It is an object of our invention to provide an apparatus which has sufficiently speedy response and high enough sensitivity to measure accurately the temperature changes in materials during rapid heating and cooling.

It is another object of our invention to provide an apparatus with which the temperature change in materials accompanying transformations occurring during a heating or cooling cycle can be followed.

It is a third object of our invention to provide an apparatus with which time rate of temperature change of a specimen being heated or cooled at any rate can be visually indicated and recorded.

A fourth object of our invention is to provide an apparatus in which the indicating device is substantially inertialess, thus making the apparatus extremely sensitive and responsive to the changes being measured.

Other objects and advantages of our invention will in part be obvious and in part appear hereinafter.

Our invention comprises a temperature detecting and measuring device and a method and means for increasing the sensitivity thereof and includes the combination of elements and relationship of parts and the combinations of steps and the relationship to each other which will be more fully described hereinafter.

In describing our invention, reference will be made to the appended drawings in which:

Figure 1 is a general diagram of the apparatus, partially schematic;

Figure 2 is a representation of one form of thermoelectric detecting circuit;

Figure 3 is a schematic representation of a second form of thermoelectric detecting circuit;

Figure 4 is a diagram of a third form of thermoelectric detecting circuit.

The device shown in Figure 1 comprises a thermocouple 10 which, upon being heated, produces a direct voltage proportional to the degree of heating. This direct voltage is converted into a pulsating signal by means of a make-break device, schematically represented by contacts 11. The pulsating signal produced thereby is amplified by the wide-band, two stage amplifier circuit comprising tubes 12 and 13, the amplified signal then being rectified by tubes 14 and 15, filtered by resistance-capacitance circuits 16 and 17 and applied to the deflection plates of the cathode ray tube 18. A means whereby the sensitivity of the temperature indication may be improved is provided by the thermocouple biasing circuit comprising, a biasing cell 19, a resistor 20 and an adjustable resistor 21. A sawtooth generator may be applied to the opposite deflection plates of the cathode ray tube to provide a time reference for the temperature measurements.

The principle of our invention can best be explained and understood by referring to Figure 1. The temperature of a specimen is detected by a thermocouple 10 attached to the surface of the specimen, said temperature producing a proportional voltage in the thermocouple.

Inasmuch as the maximum voltage output of common thermocouples is approximately fifty millivolts (0.050 volt), it is desirable to amplify the thermoelectric signal obtained in order to provide for convenient measurement. Because of the drift which would be encountered by using a resistance coupled amplifier as a means for amplifying such small voltages to a value necessary to give convenient deflection on a cathode ray tube screen, temperature calibration might easily be in error. It is, therefore, advisable to employ a resistance-capacitance coupled amplifier, and since this type will amplify only alternating or pulsating currents, provision is made for deriving an alternating or pulsating signal from the thermoelectric voltage.

In the circuit diagram of Figure 1, the method of deriving the pulsating signal is indicated schematically by means of a pair of contacts 11. This make-break arrangement may take any one of several forms, as will be indicated with reference to Figures 2, 3 and 4. The pulsating temperature signal obtained by the making and breaking of contacts 11 preferably has a relatively high repetition frequency, i. e., about 500 pulses per second. However, this is not a critical point, for we have used pulse repetition frequencies as low as 60 per second and as high as 1000 per second. The pulsating signal is amplified by a wide band, resistance-capacitance coupled amplifier comprising tubes 12 and 13 to a value sufficiently large for convenient display on the cathode ray tube screen. The output of the amplifier is rectified by tubes 14 and 15, filtered by resistance-capacitance circuits 16 and 17, and applied to the vertical deflection plates of the cathode ray tube 18. It is essential that the filtering networks 16 and 17 match the pulse repetition frequency of the pulsating signal in the sense that substantially all ripple be taken out of the rectified current and the voltage applied to the plates of the cathode ray tube be smooth.

To improve the sensitivity of the temperature indication, a thermocouple biasing circuit comprising a cell 19, resistor 20, and adjustable resistor 21 is provided in order to make it possible during a single heating cycle of the instrument to have the cathode ray tube beam swing across the screen and back, as the temperature indication. This device provides doubly sensitive temperature indication in terms of degrees per inch of deflection of the beam. In setting this auxiliary thermocouple biasing circuit, cell 19 is oriented to give a potential of polarity opposite to that which will be generated by the heating of the thermocouple and of about one half the maximum value expected. Thus, during the heating of a specimen, there is, at first, a gradual diminution of the amplitude of the voltage pulses to zero, followed by a gradual enlargement of pulse amplitude with the pulses offset from the first by one-half cycle. The result is a reversal in the direction of the deflection of the beam during a single heating cycle. The positioning controls of the cathode ray oscillograph and the amplifier can be used to start the trace on one side of the screen and to amplify the deflecting voltage so that reversal of the trace will occur at the opposite side of the screen. The circuits associated with said controls are not shown for they are conventional and form no part of our invention.

Figure 2 illustrates an alternative method and apparatus for deriving the pulsating signal from the thermoelectric voltage. It is seen that the contacts 11 of Figure 1 have been replaced by a switch tube 22, the thermocouple voltage being applied to one grid and a periodic signal being applied to another grid. The amplitude and frequency of the periodic signal can be so adjusted that the tube will be periodically conducting and cut off. Variation of the time the tube is cut off and the frequency of the cut-off periods is controlled by the amplitude and frequency of the periodic signal. This signal can be a sinusoidal, square, or sawtooth wave.

Figure 3 illustrates a second alternative method and apparatus for deriving the pulsating signal and takes the form of a relay 30 activated by a periodic signal generator. This signal can be a sinusoidal, square, or sawtooth wave, and the relay can be built to operate, or open, at a given voltage. By varying the length of the signal period or its amplitude, the pulse repetition frequency of the thermoelectric signal sent to the amplifier and cathode ray tube can be varied as desired.

Figure 4 illustrates a third alternative method and apparatus for deriving the pulsating signal in the form of a device which, for many purposes, may be preferable to those of Figures 2 and 3. This device consists of a transformer having a primary winding 40 through which an alternating signal is impressed upon split secondary windings 41 and 42, arranged in such manner that tubes 43 and 44 will conduct or be cut off simultaneously. Resistor 45 is used to balance the two tubes, and load resistor 46 provides for the voltage drop to be amplified, rectified and displayed on the cathode ray tube screen.

In operation, assuming first no signal from the thermocouple, a sinusoidal wave of 500 cycles per second, for example, is impressed upon the primary winding 40 and is thus introduced through split windings 41 and 42 to tubes 43 and 44. These windings are arranged so that, on the positive half-cycle of the sinusoidal wave, both tubes will conduct, and, on the negative half-cycle, both tubes will be cut off. The impressed signal is of such amplitude as to effect complete cut-off and complete saturation conduction of the tubes.

When both tubes are conducting it appears that the tubes as shown in the diagram will conduct in such manner as to produce opposite currents in load resistor 46. Because of inherent physical difficulties encountered in matching tubes to draw identical currents, the variable resistor 45 is used to effect the match. Under conditions of optimum matching, there is, therefore, no current flow through load resistor 46.

When the thermocouple 10 is heated, for example, to such a temperature as to produce a thermo-electromotive force of a few millivolts, on the negative half cycle of the signal impressed through winding 40, there will be no current flow through the tubes 43 and 44 and therefore no voltage drop across load resistor 46. On the positive half cycle, however, tubes 43 and 44 will conduct and, under conditions of optimum matching of these tubes, only the current supplied by the thermocouple will produce a voltage drop across the load resistor 46. A pulsating signal, whose amplitude is substantially that of the thermoelectric voltage, is thus produced at the desired frequency.

In order to obtain a photographic record of a specific temperature cycle, a time reference plot of temperature change is used. Inasmuch as we have described the device wherein temperature is plotted by the vertical deflection of the cathode ray beam, the time reference will, of course, be plotted by the horizontal deflection of the cathode ray beam. This is easily accomplished by applying a linear sawtooth wave of desired frequency from a sawtooth wave generator to the horizontal deflection plates of the cathode ray tube.

It is understood that, although we have described our invention through an illustration whereby temperature potential is applied to the vertical deflection plates to form the ordinate and time is plotted as the abscissa, these factors may just as readily be presented as abscissa and ordinate respectively.

It is to be understood that our invention is not restricted to the present disclosure to any extent otherwise than as restricted by the manner in which such invention is claimed.

The invention described herein may be manufactured and used by or for the Government of the United States of America for governmental purposes without the payment of any royalties thereon or therefor.

What we claim is:
1. A temperature variation indicating apparatus comprising, in combination, a temperature detecting circuit including a thermoelectric element, a potential source for biasing said thermo- electric element at a predetermined level equal to substantially half the maximum thermoelectric output voltage for a given temperature variation, an interrupter in said thermoelectric circuit for periodically making and breaking said circuit to derive a pulsating signal therefrom, an amplifier for amplifying said pulsating signal, a cathode ray tube, and a pair of rectifier elements driven by the output of said amplifier and connected to said cathode ray tube to couple signals having opposite polarity to opposite deflection plates of said cathode ray tube.

2. In a temperature variation indicating apparatus, a thermoelectric element for producing an output voltage responsive to temperature, a biasing potential source connected in series with said thermoelectric element for biasing said element at a predetermined level equal to substantially half its maximum output voltage for a given temperature variation, means for deriving a pulsating signal from said output voltage comprising, first and second tubes each having at least cathode, anode, and control grid electrodes, a transformer having primary and first and second secondary windings, an alternating voltage source alternating at the desired pulsing rate and connected to said primary, said first and second secondaries being connected respectively between the cathode and grid electrodes of said first and second tubes, said last named connection being made with like polarity to drive said grids in phase, a load resistor, first and second interconnecting means respectively connecting the cathode of said first tube to the anode of said second tube and the cathode of said second tube to the anode of said first tube, said load resistor, thermoelectric element and biasing means being connected in series between said first and second interconnecting means, an amplifier having its input connected across said load resistor, a cathode ray tube, and a pair of rectifier elements driven by the output of said amplifier and connected to said cathode ray tube to couple signals having opposite polarity to opposite deflection plates of said cathode ray tube.

3. In a temperature variation indicating apparatus, a thermoelectric element for producing an output voltage responsive to temperature, a biasing potential source connected in series with said thermoelectric element for biasing said element at a predetermined level equal to substantially half its maximum output voltage for a given temperature variation, means for deriving a pulsating signal from said output voltage comprising, first and second tubes each having at least cathode, anode, and control grid electrodes, a transformer having primary and first and second secondary windings, an alternating voltage source alternating at the desired pulsing rate and connected to said primary, said first and second secondaries being connected respectively between the cathode and grid electrodes of said first and second tubes, said last named connection being made with like polarity to drive said grids in phase, a load resistor, first and second interconnecting means respectively connecting the cathode of said first tube to the anode of said second tube and the cathode of said second tube to the anode of said first tube, said load resistor, thermoelectric element and biasing means being connected in series between said first and second interconnecting means.

ARTHUR L. CHRISTENSON.
CLARENCE E. JACKSON.

REFERENCES CITED

The following references are of record in the file of this patent:

UNITED STATES PATENTS

| Number | Name | Date |
| --- | --- | --- |
| 1,363,267 | Porter | Dec. 28, 1920 |
| 1,753,486 | Travis | Apr. 8, 1930 |
| 2,113,164 | Williams | Apr. 5, 1938 |
| 2,166,310 | Lord | July 18, 1939 |
| 2,178,471 | De Bruin | Oct. 31, 1939 |
| 2,293,135 | Hallmark | Aug. 18, 1942 |